United States Patent Office 3,281,274
Patented Oct. 25, 1966

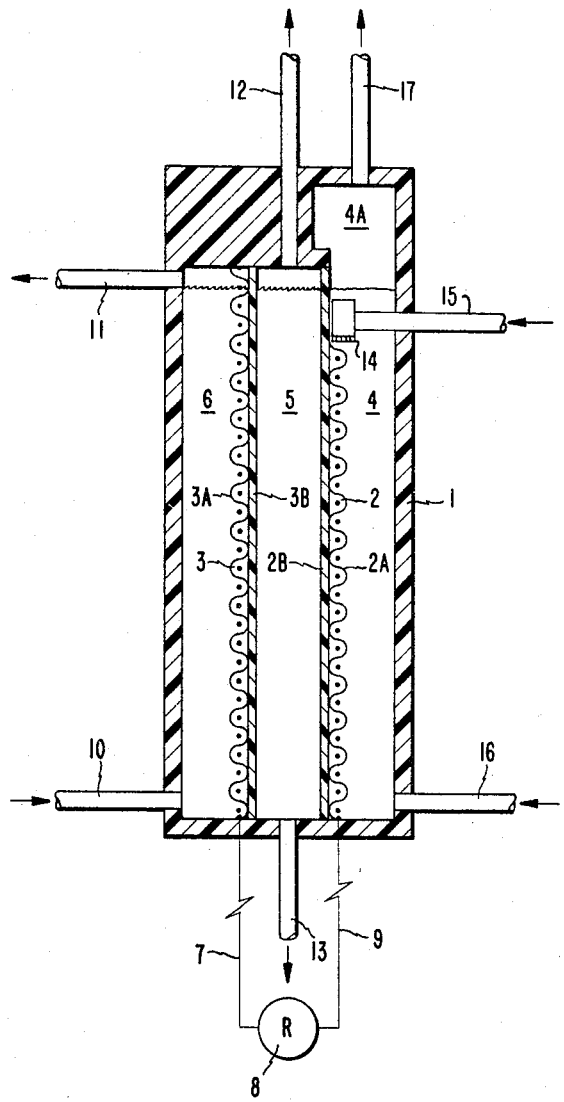

3,281,274
ELECTROCHEMICAL CELL AND METHOD OF REGENERATING NITRIC ACID IN AN ELECTROCHEMICAL CELL
Andreas W. Moerikofer, Fanwood, N.J., assignor to Esso Research and Engineering Company, a corporation of Delaware
Filed Oct. 29, 1962, Ser. No. 233,690
7 Claims. (Cl. 136—86)

This invention relates to electrochemical conversion of chemical energy to electrical energy. In particular, this invention relates to a novel fuel cell and to a process for the operation of a fuel cell wherein a combustible fuel is anodically oxidized, nitric acid or a partial reduction product thereof is cathodically reduced and the reduction products of such acid chemically regenerated by intimately contacting such products with oxygen in gas phase in the presence of a liquid aqueous electrolyte and a surface active agent. More particularly, this invention relates to an improved method for effecting multiple regenerations of nitric acid in a fuel cell.

The term "fuel cell" is used herein and in the art to denote a device, system or apparatus wherein chemical energy of a combustible fuel is electrochemically converted to electrical energy at a nonsacrificial or inert electrode. The true fuel cell is adapted for continuous operation and is supplied with both fuel and oxidant from sources outside the cell proper. Such cells include at least two nonsacrificial or inert electrodes, functioning as an anode and cathode respectively, which are separated by an electrolyte which provides ionic conductance therebetween, conduction means for electrical connection between such anode and cathode external to such electrolyte, means for admitting a fluid fuel into dual contact with the anode and electrolyte and means for admitting a fluid oxidant into dual contact with the cathode and electrolyte. Where necessary or desired, the electrolyte compartment is divided into an anolyte compartment and a catholyte compartment by an ion-permeable partition or ion-exchange membrane. In certain embodiments two or more of such partitions may be employed to further subdivide the electrolyte compartment, e.g., as where a central electrolyte compartment is provided between electrodes and the aforementioned anolyte and catholyte compartments are positioned on the opposite sides of the respective electrodes. Thus, in each such cell hydrogen gas or a fluid organic fuel is electrochemically oxidized at the anode with a release of electrons to such anode and an oxidant is electrochemically reduced at the cathode upon receiving electrons from such cathode.

With respect to the reduction of oxidant in the cathodic half-cell, fuel cells can be divided into two general types. In this division, the first group would then include those cells wherein the direct or primary oxidant is free oxygen admitted to the catholyte as oxygen gas, air, hydrogen peroxide, etc., and is electrochemically reduced at the cathode. The second group includes those cells wherein the direct oxidant comprises an oxygen comprising compound which is electrochemically reduced at the cathode and subsequently chemically regenerated by a secondary oxidant which may be one or more of the conventional oxidants of the first group. This invention is concerned with those cells of the aforementioned second group wherein the primary oxidant employed is nitric acid or a partial reduction product thereof and wherein the reduction products of such primary oxidant are chemically reoxidized with free oxygen gas to regenerate nitric acid or a reducible reduction product thereof. The term "free oxygen gas" is used to designate a gas wherein oxygen is present which is not chemically combined with another element, e.g. oxygen in air.

The regeneration of nitric acid from its gaseous reduction products is greatly facilitated if a foam-forming agent, particularly a surface active agent, is employed in conjunction with a catholyte and secondary oxidant.

It has been shown that the presence of a foam layer above the liquid level of the catholyte in the catholyte compartment in a fuel cell increases the regeneration efficiency of the primary oxidant. The electrochemical reduction of the primary oxidant at the cathode can be expressed by the following equation:

$$HNO_3 + 3H^+ + 3e \rightarrow NO + 2H_2O$$

Economical operation of such a cell requires that the NO be regenerated to $HNO_3$ for reuse at the cathode and that the losses of NO with escaping secondary oxidant be minimized. Foam bubbles hold both NO, the ultimate reduction product of $HNO_3$, and molecular oxygen gas and thereby increase the available contact time for their reaction. These bubbles also provides in their walls the water necessary to react the $NO_2$, i.e., the reaction product of NO and oxygen, to $HNO_3$. Preferably a stable foam layer, which is rich in liquid and has small bubbles, is employed to effect the regeneration. Said bubbles should have essentially uniform diameters. The diameters should be within the range of about 0.5 to about 5 millimeters, preferably in the range of about 1 to 2 millimeters.

For maximum efficiency it is necessary that the NO gas be retained in intimate contact with oxygen gas of sufficient quantity for a sufficient time to convert essentially all of the NO to the $NO_2$ and that the latter be maintained in intimate contact with the aqueous acid catholyte for a time sufficient to convert the same to a reaction product which is a liquid under the conditions of operation.

It has now been discovered that the efficiency of the cell's operation is markedly improved and the qualitative requirements for the surface active agent greatly reduced if such surface active agent, hereinafter sometimes referred to as surfactant, is introduced to the catholyte and then the secondary oxidant, e.g., air or molecular oxygen gas, is admitted downwardly into the catholyte from a gas injector placed below the upper level of the electrolyte and directly above the cathode.

The gas injector, emitter, or sparger, hereinafter referred to as "injector," used in this process must have essentially uniform pore diameters and a porosity within the range of about 5 to 180 microns, preferably from about 25 to 50 microns. The injector may be composed of any porous material which is not attacked by the electrolyte.

The gas injector is placed horizontally above the cathode so that the bottom of the injector parallels essentially the entire upper edge of the cathode. If when looking down from the top of the cell the upper edge of the cathode is ring like, then the sparger must have a circular horizontal cross section and have a diameter slightly larger than the diameter of the cathode. If the cathode is a planar body, its upper edge would be relatively long and narrow. In such a circumstance the injector could be shaped as a cylinder, a ½ cylinder, elliptical tube, or any other convenient shape so long as the width and length of the injector are essentially the same as the top edge of the cathode. The actual shape of the injector is not critical as long as it is large enough so that the emitted gas will be emitted downward over substantially the entire length of the cathode. The preferred shape of the injector is one wherein the bottom portion, i.e., that part of the injector directly above the upper edge of the cathode, is elliptical or flat. The injector may be entirely porous, i.e., having pore openings in all of its surface area, or the pores which would not emit a gas directly downward may be sealed. Injectors composed of porous and non-porous materials may be effectively used. Examples of such injectors would be a bell shaped sparger having a horizontal fritted glass bottom plate and the remaining curved portion being either glass or ceramic; a cylinder divided longitudinally into halves, one half being glass or ceramic and the other half being porous fritted glass. The preferred injector is one having pores only in the bottom portion thereof.

The injector is placed immediately above the cathode and below the upper level of the electrolyte. The porous bottom portion of the injector directs the gaseous secondary oxidant down over the cathode. As the secondary oxidant moves downwardly over and around the cathode it is intimately mixed with the NO which is formed at the cathode and then rises. This countercurrent action assures an intimate mixing of the two gases. As the gases mix they form small bubbles of intimately mixed NO and secondary oxidant which rise to the surface of the liquid electrolyte. The surfactant which is present in the electrolyte lengthens the time before which the bubbles will degenerate. Each of the thus formed bubbles acts as a tiny oxidation chamber to produce $NO_2$. The thus produced $NO_2$ reacts with the water in the bubble wall to form $HNO_3$. As the bubbles degenerate the liquid nitric acid drains back into the electrolyte.

The foaming agents employed in accordance with this invention are water soluble. They are preferably relatively inert to electrochemical reduction when in contact with the cathode. The foaming properties of such compounds should be substantially unaffected by the presence of oxygenated hydrocarbons, e.g., alcohols. Preferably they have high cloud point temperatures and are relatively stable in strong sulfuric acid at the temperatures of cell operation. Such compounds preferably provide a stable foam with relatively small bubbles which foam is collapsible under certain desirable conditions.

Surface active agents, hereinafter sometimes referred to as surfactants, that may be advantageously employed in accordance with this invention include nonionic surfactants including, by way of example, adducts of ethylene oxide or propylene oxide and high molecular weight fatty alcohols, alkyl phenols or dialkyl phenols; including also polyoxyethylene polyoxypropylene polyoxyethylene ethanols; including also fluorinated hydrocarbons. Anionic surfactants that may be advantageously employed include, by way of example, alkyl substituted diphenyl ether sulfonates; they also include phosphate esters of the aforementioned adducts of ethylene oxides and fatty alcohols; they also include fluorinated hydrocarbons with anionic groups and also include alkylbenzene sulfonates.

Classes of surface active agents hereinbefore described include types of compounds such as: Nonionic surfactants as by way of example: adducts of ethylene oxide or propylene oxide and high molecular weight fatty alcohols or alkyl phenols or dialkyl phenols. The general formula is $$R-O-[(CH_2)_m-O]_nH$$

where R represents a fatty alcohol, an alkyl phenol or a dialkyl phenol, $m$ is 2 or 3 and $n$ is a number between 1 and 30. The fatty alcohol groups may have from 1 to 30 carbon atoms per molecule, preferably from 8 to 16. The alkyl phenol groups may have from 7 to 30 carbon atoms, preferably from 13 to 22. The dialkyl phenol groups may have from 8 to 44 carbon atoms, preferably from 18 to 30. The number of ethylene oxide or propylene oxide units ($n$) per molecule may vary between 1 and 30. The number $n$ is preferably between 4 and 15 in the adduct with fatty alcohols, between 10 and 20 in the adduct with alkyl phenols and between 15 and 30 in the adduct with dialkyl phenols. These surfactants can be further characterized by the ratio between the hydrophilic and the lipophilic part of the molecule. This ratio is called the "Hydrophilic-Lipophilic Balance"—or HLB-number and is calculated in cases of these nonionic surfactants by dividing by five the amount in wt. percent of ethylene oxide in the molecule. This HLB-number will range from about 9 to about 16 in the adducts with fatty alcohols and from about 13 to 17 in the adducts with alkyl and dialkyl phenols.

Other hereinbefore described nonionic surfactants are hydroxyl polyoxyethylene polyoxypropylene polyoxyethylene ethanol with the formula $$HO-(CH_2CH_2O)_x-(CH_2CH_2CH_2O)_y-(CH_2CH_2O)_z-CH_2CH_2OH$$

The total number of ethylene oxide units ($x+z$) is between about 3 to 45, preferably from 29 to 45. Corresponding HLB-values range from about 10 to 16. The number $y$ of propylene oxide units may vary from about 20 to 43, preferably from 30 to 43. Another class of foam forming nonionic surfactants are perfluorinated hydrocarbons with a hydrophilic organic or inorganic group.

Also within the scope of this invention are anionic surfactants including by way of example: alkyl phenyl sulfonates

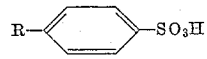

wherein the alkyl group R can have from 1 to 18 carbon atoms; mono- and diphosphate esters of the aforementioned adducts of ethylene oxide and fatty alcohols or alkyl phenols with the general formula

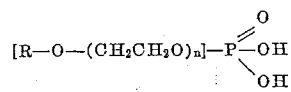

The number of carbon atoms can be from 1 to 30, preferably from 7 to 22 and the number of ethylene oxide units can be from 4 to 30, preferably from 10 to 15. The corresponding HLB-numbers range from about 12 to about 15. Other anionic surfactants of the type of alkyl substituted diphenyl ether sodium disulfonates have the general formula

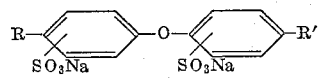

R is an alkyl group with 1 to 15 carbon atoms, preferably between 6 to 12. In some surfactants R' represents hydrogen (monoalkylation), in others it represents partial alkylation (20%) with the same alkyl group as R. Other anionic surfactants are included in this invention wherein the lipophilic portion of the molecule comprises a perfluorocarbon and the hydrophilic group is of organic or inorganic nature.

Specific examples of the surface active agents hereinbefore described include compounds such as: Adduct of ethylene oxide and tridecyl alcohol with a mole ratio of 9:1, also called polyoxyethylene ether of tridecyl alcohol, $C_{13}H_{27}O-(CH_2CH_2O)_9-H$; adduct of ethylene oxide and iso-octyl phenol with a mole ratio of 12:1, also called isooctylphenoxy polyoxyethylene ethanol,

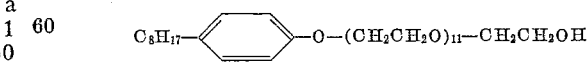

adduct of ethylene oxide and diisooctyl phenol, also called diisooctylphenoxy polyoxyethylene ethanol,

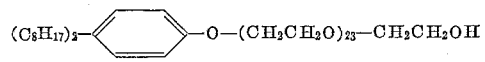

hydroxy polyoxyethylene polyoxypropylene polyoxyethylene ethanol, $$HO-(CH_2CH_2O)_{22}-(CH_2CH_2CH_2O)_{43}-(CH_2CH_2O)_{21}-CH_2CH_2OH$$

sodium dodecyl phenyl sulfonate,

monophosphate ester of polyoxyethylene ether of tridecyl alcohol,

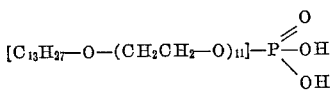

sodium dodecyl oxydibenzene disulfonate,

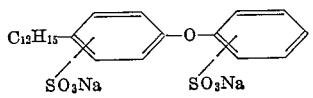

The foaming agent, i.e., surfactant, used in accordance with this invention is employed in a concentration sufficient to provide a stable foam in the regeneration zone to entrap the NO released at the cathode and hold the same until reoxidation is attained. When introduced directly into the catholyte and subsequently contacted with the secondary oxidant, e.g., air, the concentration of the foaming agent in the catholyte will be maintained in the range of about 0.001 to 10 wt. percent, preferably about 0.1 to 2 wt. percent. The foaming agent may be introduced continuously or intermittently.

When nitric acid or a reducible reduction product thereof, e.g., $NO_2$, $N_2O_4$ or $HNO_2$, is employed as the primary oxidant, the cell ordinarily will be operated with an electrolyte temperature in the range of about 0 to 400° F., preferably about 140 to 180° F. The preferred electrolyte is aqueous sulfuric acid which may be employed in the conventional concentrations, disclosed in the literature, e.g., about 1 to 50 wt. percent, preferably about 20 to 50 wt. percent. In the catholyte the primary oxidant is employed in concentrations of about 0.3 to 6 wt. percent, or above, preferably in the range of about 0.7 to 2 wt. percent.

The primary oxidant may be introduced to the catholyte in the form of nitric acid, or a reduction product of nitric acid, e.g., $NO_2$, $N_2O_4$, or as a water soluble salt of such, as $NaNO_3$, $KNO_3$, $NaNO_2$ or $KNO_2$. The use of gaseous $NO_2$ as the main source of primary oxidant supply provides certain advantages over the use of the liquid nitric acid in that once in the cell the $NO_2$ rapidly and efficiently reacts with the water present to form $HNO_3$ and the need for transporting the water content of $HNO_3$ to the cell installation site is eliminated.

The cold start-up of the cell is difficulty effected with $HNO_3$ alone. In cases where external heating is not available for start-up, the addition of small quantities of nitrite salts (e.g., $NaNO_2$, $KNO_2$) to the electrolyte is useful. Upon addition of the salt to the electrolyte the same will decompose in the acid medium to provide $HNO_2$, which is a satisfactory initiator for the reaction. In a preferred embodiment in the reaction is initiated by the introduction of gaseous $NO_2$ both as initiator and primary oxidant supply.

This invention will be more easily understood from the accompanying drawing.

Referring now to the drawing, there is shown a fuel cell container or vessel 1 containing a cathode assembly 2 comprising a wire screen electrode 2A and a porous organic membrance 2B, an anode assembly 3 comprising a wire screen electrode 3A and a porous organic membrane 3B. The interior of vessel 1 is divided by cathode assembly 2 and anode assembly 3 into a catholyte compartment 4, a central electrolyte compartment 5 and an anolyte compartment 6, each of which, as here shown, contain an aqueous electrolyte, e.g., 30 ft. percent sulfuric acid. The electrodes 2A and 3A are shown electrically connected by wires 7 and 9 and resistance means 8 which is symbolic of any device or appliance adapted for utilizing direct current electrical energy. Fuel inlet conduit 10 provides means for introducing an electrolyte soluble fuel, e.g., a lower molecular weight alcohol or olefin to anolyte compartment 6. Fuel exhaust conduit 11 provides means for removing carbon dioxide formed by the electrochemical oxidation of such fuel at the anode and also provides means for removing excess water from the anolyte. Central electrolyte compartment 5 is shown equipped with an upper conduit 12 and a lower conduit 13 which may be used as means of ingress and egress to and from such compartment for the removal or addition of electrolyte and for the removal of any gaseous reaction products which may escape into compartment 5 from either anolyte compartment 6 or catholyte compartment 4. Catholyte compartment 4 is here shown having an enlarged upper portion or regeneration zone 4A in which foam is maintained. A dispensing means 14 comprising a gaseous injector having a porous bottom portion is positioned within catholyte compartment 4, so that said injector is below the upper liquid level of the catholyte. Communicating with dispensing means 14 is air inlet conduit 15 through which the secondary oxidant required for regeneration is admitted to the catholyte. It is to be understood that conduit 15 may enter the catholyte zone at an angle or vertically. Air inlet conduit 16 is provided at a lower portion of catholyte compartment 4 to provide an auxiliary means for introducing the secondary oxidant where a greater flow rate of the same is advantageous. The secondary oxidant is removed from the cell through catholyte exhaust conduit 17. This stream, if desired, may be recycled to the catholyte compartment.

The invention is more fully illustrated by the following examples which are illustrative only and should not be construed as limitations on the true scope of the invention as set forth in the claims.

*Example 1*

The effect of introducing the molecular oxygen as aforedescribed was compared with a comparable regeneration technique in which the oxygen was added by other means. The electrolyte employed was 29 wt. percent aqueous sulfuric acid. The primary oxidant concentration was about 1 wt. percent calculated as $HNO_3$. The flow rate of secondary oxidant to the catholyte was about 40 cc./min. The temperature was maintained at about 180° F. The current density was about 30 amps./sq. ft. The injector used in accordance with this invention in cross-section was bell shaped with a fritted-glass bottom portion having a porosity of about 50 microns. It was placed above the cathode. The injector for the comparable technique was a fritted glass cylinder having a porosity of about 50 microns. It was placed obliquely below the cathode. The secondary oxidant was passed into the cells through the injectors. The following table shows the results of the tests.

| Surfactant | Secondary Oxidant | Regeneration efficiency | Injector |
|---|---|---|---|
| None | $O_2$ | 4.2 | A. |
| None | $O_2$ | 1.0 | B. |
| Sodium dodecylated oxydibenzene disulfonate. | Air | 3.9 | A. |
|  | Air | 14.0 | B. |
|  | $O_2$ | 28 | B. |

Injector A was the fritted glass cylinder placed obliquely below the cathode. Injector B was the bell-shaped injector having a porous, fritted-glass bottom portion placed above the cathode.

*Example 2*

A test was run to test the efficiency of the disclosed improved method of regenerating the primary oxidant. The electrolyte employed was 29 wt. percent sulfuric acid. The surfactant was sodium nonylated oxydibenzene disulfonate. The primary oxidant concentration was 1 wt. percent calculated as $HNO_3$. The flow rate of secondary oxidant, oxygen, to the catholyte was from 14 to 20 c.c./min. A constant current of 1.39 amps., which corresponds to 72 amps/sq. ft., was drawn at a temperature of 180° F. A bell shaped gas injector having substantially uniform pore diameters and a porosity of between 25 to 50 microns was placed closely above the cathode and beneath the upper level of the electrolyte. A stable foam layer of 3 inches was maintained during the 94-hour run of the test. The cell failed after the passage of 468,000 coulombs which corresponds to a regeneration efficiency of 225 cycles. This indicates a loss of less than 0.5% of the initial charge of nitric acid per cycle.

What is claimed is:

1. In a method of regenerating nitric acid in an electrochemical cell wherein nitric acid is essentially reduced to nitric oxide, said cell containing a catholyte compartment said compartment containing an aqueous liquid catholyte and a cathode immersed in said catholyte, the improvement comprising adding a surfactant to said catholyte, dispensing free oxygen gas into said catholyte from a position directly above said cathode and below the upper level of said catholyte, thereby forming small bubbles of foam comprising an intimate mixture of free oxygen and nitric oxide each of said bubbles acting as an oxidation chamber for the production of $NO_2$.

2. A method as in claim 1 wherein said bubbles are from 1 to 2 millimeters in diameter.

3. A method as defined by claim 1 wherein said surfactant is anionic.

4. A method as defined by claim 1 wherein said surfactant is nonionic.

5. A method as defined by claim 1 wherein said surfactant is sodium dodecyl oxydibenzene disulfonate.

6. An improved electrochemical cell comprising an electrolyte container having a surfactant containing aqueous electrolyte therein, porous electrodes comprising a foraminous anode and a foraminous cathode separated by a porous membrane, said electrodes and membrane positioned in said electrolyte container to form an anolyte compartment and a catholyte compartment, conduction means establishing electrical communication between said anode and said cathode external to said electrolyte container, a first inlet means for admitting a primary oxidant into said catholyte compartment, a second inlet means for admitting a fuel into said anolyte compartment, said cathode being positioned between the first inlet means and said membrane, said anode being positioned between the second inlet means and said membrane, a third inlet means comprising a gas injector having a porous, lower portion, for dispensing free oxygen downwardly into the catholyte compartment, said lower portion of said injection being positioned above said cathode and below the upper level of the electrolyte, said lower portion of said injector having a porosity in the range of from about 25 to 50 microns.

7. An electrochemical cell as defined in claim 6 wherein said lower portion of said injector is fritted-glass.

References Cited by the Examiner

UNITED STATES PATENTS

| | | | |
|---|---|---|---|
| 3,116,170 | 12/1963 | Williams et al. | 136—86 |
| 3,152,015 | 10/1964 | Juda | 136—86 |

FOREIGN PATENTS

| | | |
|---|---|---|
| 237,764 | 7/1959 | Australia. |
| 12,818 | 1908 | Great Britain. |
| 15,727 | 1906 | Great Britain. |

WINSTON A. DOUGLAS, *Primary Examiner.*

ALLEN B. CURTIS, *Examiner.*